US012743508B2

(12) United States Patent
Gauthier et al.

(10) Patent No.: US 12,743,508 B2
(45) **Date of Patent: *Sep. 22, 2026**

(54) AUTOMATIC DETECTION OF DESERIALIZATION ATTACKS WITH MARKOV CHAINS

(71) Applicant: Oracle International Corporation, Redwood Shores, CA (US)

(72) Inventors: Francois Gauthier, Brisbane (AU); Sora Bae, Carindale (AU)

(73) Assignee: Oracle International Corporation, Redwood Shores, CA (US)

( * ) Notice: Subject to any disclaimer, the term of this patent is extended or adjusted under 35 U.S.C. 154(b) by 92 days.

This patent is subject to a terminal disclaimer.

(21) Appl. No.: 18/898,654

(22) Filed: Sep. 26, 2024

(65) Prior Publication Data

US 2025/0094576 A1 Mar. 20, 2025

Related U.S. Application Data

(63) Continuation of application No. 17/515,151, filed on Oct. 29, 2021, now Pat. No. 12,130,912.

(51) Int. Cl.

| | |
|---|---|
| ***G06F 21/55*** | (2013.01) |
| ***G06N 7/01*** | (2023.01) |
| ***G06N 20/00*** | (2019.01) |

(52) U.S. Cl.

CPC ............. *G06F 21/554* (2013.01); *G06N 7/01* (2023.01); *G06N 20/00* (2019.01); *G06F 2221/034* (2013.01)

(58) Field of Classification Search

None

See application file for complete search history.

(56) References Cited

U.S. PATENT DOCUMENTS

| | | | | |
|---|---|---|---|---|
| 11,494,489 | B1 * | 11/2022 | Vorobyov | G06F 21/56 |
| 2013/0304677 | A1 * | 11/2013 | Gupta | H04W 12/37 706/12 |
| 2014/0172753 | A1 * | 6/2014 | Nowozin | G06N 20/20 706/12 |
| 2014/0187177 | A1 * | 7/2014 | Sridhara | G06N 5/01 455/73 |
| 2015/0356451 | A1 * | 12/2015 | Gupta | G06F 21/552 706/46 |

(Continued)

OTHER PUBLICATIONS

Bylina et al., “Using Markov chains for modelling networks”. Published 2005. (Year: 2005).*

(Continued)

*Primary Examiner* — Scott B Christensen

(74) *Attorney, Agent, or Firm* — Lathrop GPM LLP

(57) ABSTRACT

A method for detecting a deserialization attack may include identifying, in a byte stream, a class name corresponding to a class, generating, for the class, a feature vector, generating, by applying a benign deserialization model to the feature vector, a benign probability window, generating, by applying a malicious deserialization model to the feature vector, a malicious probability window, comparing the benign probability window and the malicious probability window to obtain a comparison result, and determining, based on the comparison result, that the class is malicious.

17 Claims, 8 Drawing Sheets

(56) References Cited

U.S. PATENT DOCUMENTS

2018/0004948 A1* 1/2018 Martin ................ H04L 63/1425
2018/0204084 A1* 7/2018 Inoue .................... G06F 18/254

OTHER PUBLICATIONS

Cristalli, S. et al., "Trusted Execution Path for Protecting Java Applications Against Deserialization of Untrusted Data", In Proceedings of 21st International Symposium on Research in Attacks, Intrusions, and Defenses (RAIDS) Sep. 2018, pp. 445-464 (20 pages).

Pan, Y. et al., "Detecting Web Attacks with End-to-End Deep Learning" In Journal of Internet Services and Applications, vol. 10, Issue 1, pp. 1-22, Springer, Dec. 2019 (22 pages).

Sivakumaran, S. "CVE-2020-2555: RCE Through a Deserialization Bug in Oracle's Weblogic Server" Zero Day Initiative, Mar. 2020 (7 pages). https://www.zerodayinitiative.com/blog/2020/3/5/cve-2020-2555-rce-through-a-deserialization-bug-in-oracles-weblogic-server.

Oracle: Critical Patch Update Advisory—Jan. 2020 (48 pages). https://www.oracle.com/security-alerts/cpujan2020.html.

* cited by examiner

Example Features
146

| Id | Feature | Description |
| --- | --- | --- |
| 1 | Uses reflection | True if the class calls any of the following from java.lang.reflect:<br>- Constructor.newInstance()<br>- Field.set()<br>-Method.invoke() |
| 2 | Overrides readObject | True if the class overrides the method Object readObject(ObjectInputStream ois) |
| 3 | Overrides hashCode | True if the class overrides the int hashCode() method. |
| 4 | Has generic field | True if the class has a field of any of the following type:<br>- java.lang.Object<br>- java.lang.Comparable<br>- java.util.Comparator |
| 5 | Implements Map | True if the class implements the java.util.Map interface. |
| 6 | Implements Comparator | True if the class implements the java.util.Comparator interface. |
| 7 | Calls hashCode | True if the class calls any of the following methods:<br>- int java.util.Objects.hash(Object... values)<br>- int java.util.Objects.hashCode(Object o)<br>- *.hashCode() |
| 8 | Calls compare | True if the class calls any of the following methods:<br>- *.compare()<br>- *.compareTo(...) |

FIG. 1D

Send a byte stream to a deserialization manager configured to transmit a determination that a class is malicious by performing the steps of FIG. 2
Step 302

Receive, from the deserialization manager, the determination that the class is malicious
Step 304

| Classes read | $P_B$ | $P_M$ | Overlap | Decision |
|---|---|---|---|---|
| $C_1$ | [0.25, 0.30] | [0.20, 0.45] | Yes | UNDECIDED |
| $C_1, C_2$ | [0.15, 0.21] | [0.16, 0.35] | Yes | UNDECIDED |
| $C_1, C_2, C_3$ | [0.11, 0.16] | [0.15, 0.29] | Yes | UNDECIDED |
| $C_1, C_2, C_3, C_4$ | [0.06, 0.10] | [0.14, 0.27] | No | REJECTED |

| Classes read | $P_B$ | $P_M$ | Overlap | Decision |
|---|---|---|---|---|
| $C_1$ | [0.20, 0.36] | [0.15, 0.51] | Yes | UNDECIDED |
| $C_1, C_2$ | [0.12, 0.28] | [0.11, 0.42] | Yes | UNDECIDED |
| $C_1, C_2, C_3$ | [0.09, 0.23] | [0.09, 0.34] | Yes | UNDECIDED |
| $C_1, C_2, C_3, C_4$ | [0.06, 0.15] | [0.08, 0.27] | Yes | UNDECIDED |
| $C_1, C_2, C_3, C_4, C_5$ | [0.03, 0.09] | [0.07, 0.15] | Yes | UNDECIDED |
| $C_1, C_2, C_3, C_4, C_5, C_6$ | [0.01, 0.04] | [0.05, 0.12] | No | REJECTED |

AUTOMATIC DETECTION OF DESERIALIZATION ATTACKS WITH MARKOV CHAINS

RELATED APPLICATIONS

This application is a continuation application of U.S. application Ser. No. 17/515,151, filed Oct. 29, 2021, the entirety of which is hereby incorporated by reference.

BACKGROUND

In programming languages, serialization is the process of converting an in-memory object or data structure into a persistent format. Deserialization works the opposite way, by converting a formatted string (e.g., represented in JavaScript Object Notation (JSON) or extensible Markup Language (XML)) to an in-memory object or data structure. An attacker accessing the serialized form of an object can thus influence the object that will be created upon deserialization. In recent years, security researchers discovered various ways of exploiting security vulnerabilities in deserialization to cause denial-of-service attacks or arbitrary code execution in various languages such as Java, .NET, Python, and Ruby using various serialization formats such as binary, XML, and JSON. Deserialization issues have become so prominent that deserialization vulnerabilities were included in the latest Open Web Application Security Project (OWASP) Top 10 Web Application Security Risk list. To help combat the threat posed by deserialization security vulnerabilities, deserialization filters have been introduced, for example, in Java 9 and back-ported to Java 6, 7, and 8. Upon deserialization of a byte stream, the filter is invoked after resolving the class from the stream and before creating an object of that class in memory, giving the filter an opportunity to inspect the class and stop the deserialization process if an anomalous class is detected. However, the onus of developing and maintaining the filters remains on developers.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method for detecting a deserialization attack, including identifying, in a byte stream, a class name corresponding to a class, generating, for the class, a feature vector, generating, by applying a benign deserialization model to the feature vector, a benign probability window, generating, by applying a malicious deserialization model to the feature vector, a malicious probability window, comparing the benign probability window and the malicious probability window to obtain a comparison result, and determining, based on the comparison result, that the class is malicious.

In general, in one aspect, one or more embodiments relate to a system for detecting a deserialization attack, including a repository configured to store (i) a class corresponding to a feature vector, and (ii) a byte stream including a class name corresponding to the class. The system further includes a computer processor and a memory, and a feature generator executing on the computer processor and using the memory. The feature generator is configured to generate, for the class, the feature vector. The system further includes a deserialization manager executing on the computer processor and using the memory. The deserialization manager is configured to: identify, in the byte stream, the class name, generate, by applying a benign deserialization model to the feature vector, a benign probability window, generate, by applying a malicious deserialization model to the feature vector, a malicious probability window, compare the benign probability window and the malicious probability window to obtain a comparison result, and determine, based on the comparison result, that the class is malicious.

In general, in one aspect, one or more embodiments relate to a method for detecting a deserialization attack, including sending a byte stream to a deserialization manager configured to perform: identifying, in the byte stream, a class name corresponding to a class, generating, for the class, a feature vector, generating, by applying a benign deserialization model to the feature vector, a benign probability window, generating, by applying a malicious deserialization model to the feature vector, a malicious probability window, comparing the benign probability window and the malicious probability window to obtain a comparison result, making a determination, based on the comparison result, that the class is malicious, and transmitting the determination that the class is malicious. The method further includes receiving, from the deserialization manager, the determination that the class is malicious.

Other aspects of the invention will be apparent from the following description and the appended claims.

BRIEF DESCRIPTION OF DRAWINGS

FIG. 1A, FIG. 1B, FIG. 1C, FIG. 1D, FIG. 1E, and FIG. 1F show a system in accordance with one or more embodiments of the invention.

DETAILED DESCRIPTION

Figure 1A:
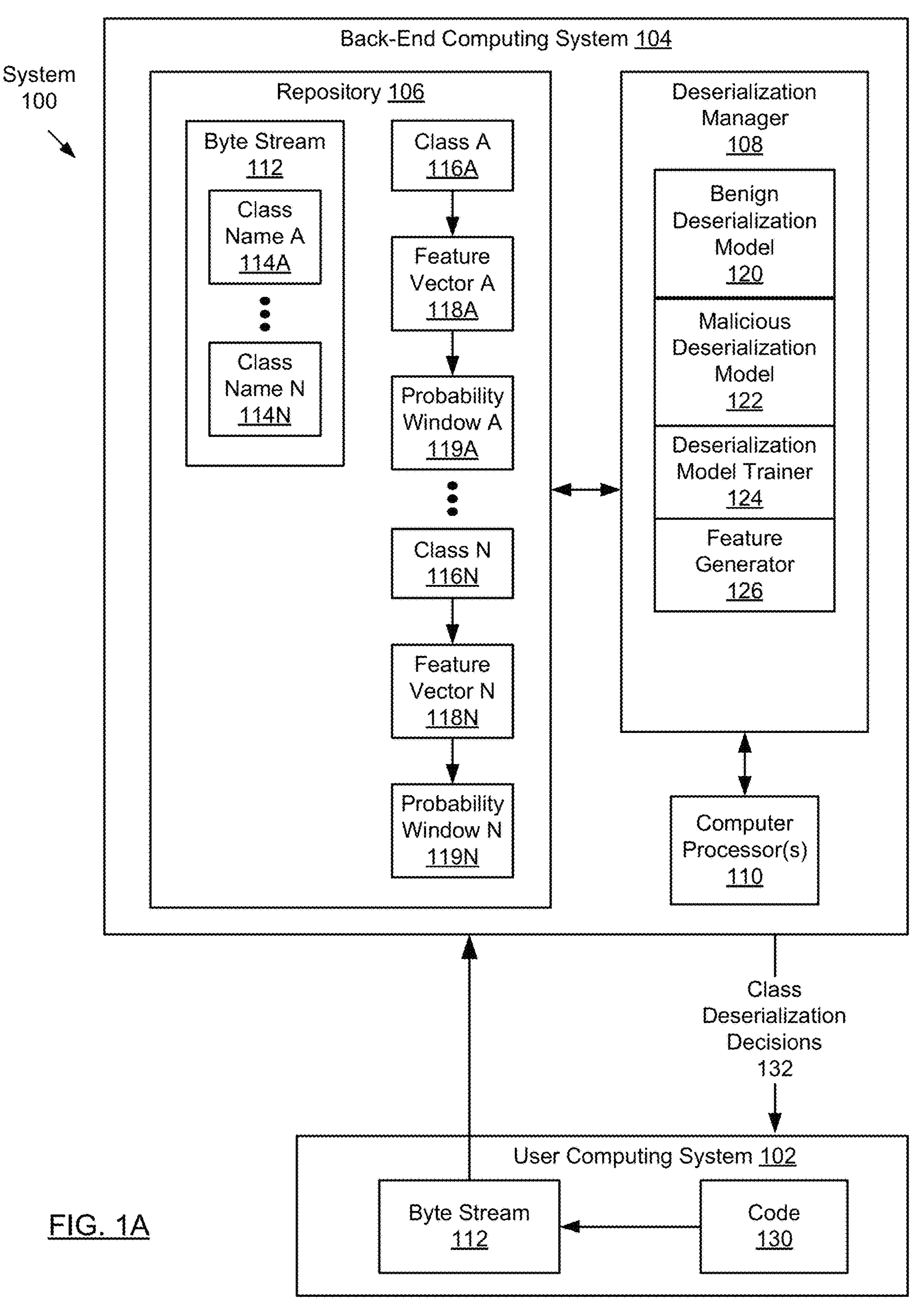

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Embodiments of the invention are directed to detecting a deserialization attack. A sequence of one or more names of classes is identified in a byte stream. The classes are mapped to Boolean vectors of features that may be exploited by potential attackers. A benign deserialization model is applied to a sequence of one or more feature vectors to generate a probability that the sequence of classes corresponding to the sequence of feature vectors is benign. Similarly, a malicious deserialization model is applied to the sequence of feature vectors to generate a probability that the sequence of classes is malicious. The benign deserialization model and the malicious deserialization model are automatically generated from benign deserialization examples and malicious deserialization examples, respectively. The probabilities are represented as probability windows (e.g., confidence intervals). When the probability windows are disjoint (i.e., non-overlapping), then a deserialization decision may be made regarding the sequence of classes. For example, the deserialization decision may be to prevent deserialization when the malicious probability window exceeds the benign probability window. Alternatively, the deserialization decision may be to allow deserialization when the benign probability window exceeds the malicious probability window. When the probability windows overlap, the deserialization decision may be deferred until one or more additional classes in the sequence of classes are processed.

FIG. 1A shows a system (100) in accordance with one or more embodiments of the invention. As shown in FIG. 1A, the system (100) includes a user computing system (102) and a back-end computing system (104). In one or more embodiments, the user computing system (102) and the back-end computing system (104) take the form of the computing system (500) described with respect to FIG. 5A and the accompanying description below or take the form of the client device (526) described with respect to FIG. 5B. The back-end computing system (104) includes a repository (106), a deserialization manager (108), and computer processor(s) (110).

In one or more embodiments, the repository (106) is any type of storage unit and/or device (e.g., a file system, database, collection of tables, or any other storage mechanism) for storing data. Further, the repository (106) may include multiple different storage units and/or devices. The multiple different storage units and/or devices may or may not be of the same type or located at the same physical site. The repository (106) may be accessed online via a cloud service (e.g., Oracle Cloud, Amazon Web Services (AWS), Egnyte, Azure, etc.).

In one or more embodiments, the repository (106) includes functionality to store a byte stream (112) and classes (116A, 116N). The byte stream (112) is a sequence of byte codes each encoding one or more characters of a character encoding set. The byte stream (112) includes class names (114A, 114N) of classes (116A, 116N) of objects to be deserialized. The byte stream (112) further includes field descriptions and/or field values (not shown) of the objects to be deserialized. A class name (114A) is an identifier of a class (116A). A class (116A) is a complex structure providing programmers with a template for constructing objects. A class (116A) may define typed fields with default values and may implements methods that define the behavior of objects of the class. A class (116A) may inherit methods from a parent class and may implement various interfaces that allow programmers to treat objects of the class (116A) as instances of the parent class or implemented interfaces.

Figure 1B:
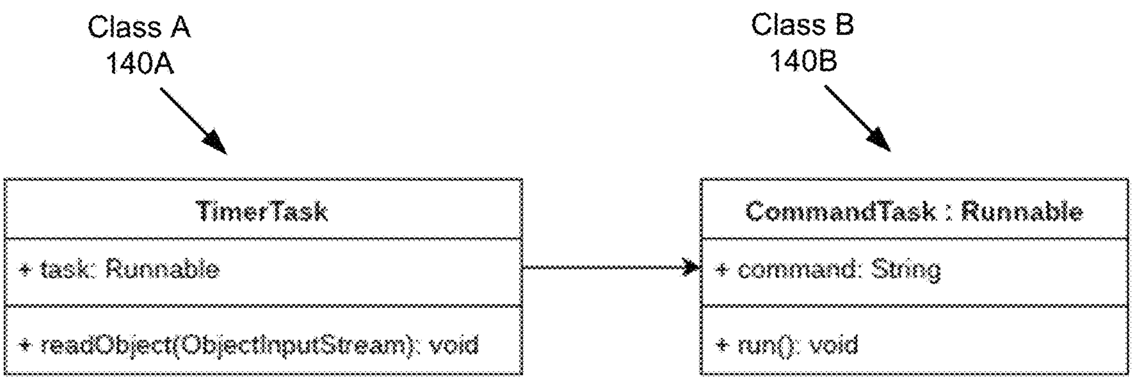
Figure 1C:
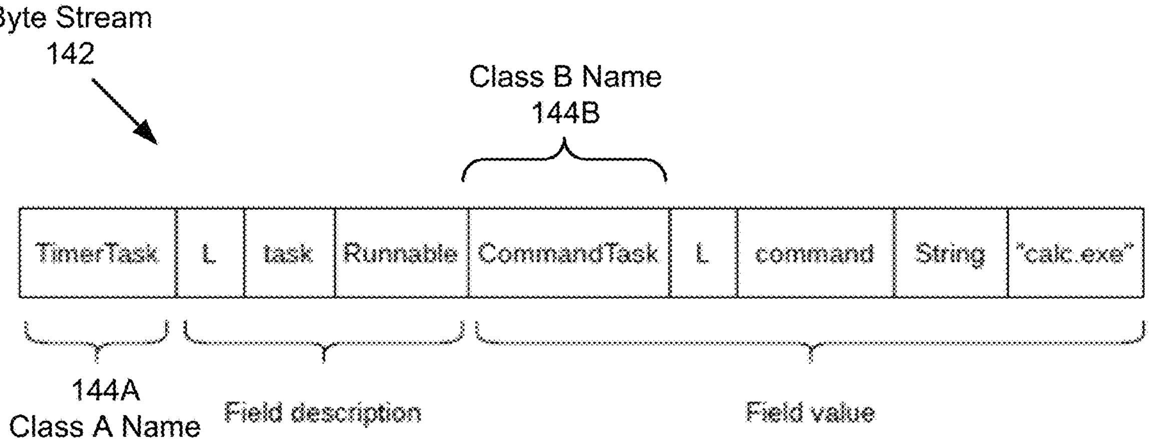

During deserialization, various features of a class (116A) may help determine if a byte stream (112) represents valid objects (e.g., valid objects in an object graph). For example, in FIG. 1B a TimerTask is constrained to reference a Runnable task. The features of a class (116A) further determine how deserialization proceeds. A class may modify the default behavior of deserialization by overriding various methods such as readObject (ObjectInputStream ois), as in the TimerTask class in FIG. 1B. For example, FIG. 1B shows definitions of class A (140A) and class B (140B), and FIG. 1C shows a byte stream (142) that includes class name A (144A) of the class (i.e., class A (140A)) of an object to be deserialized. The byte stream (142) further includes a field description and a field value of the object, where the field value includes class name B (144B) of the class (i.e., class B (140B)) of an object included in the field value.

To exploit a deserialization vulnerability, attackers may craft a byte stream (112) consisting of specific classes with specific features in a specific order that may lead to denial-of-service or arbitrary code execution, for example. The intended use of the class may be irrelevant to attackers, who focus on specific features that enable successful exploitation. FIG. 1D shows a non-exhaustive list of example features (146) that may be exploited by attackers. FIG. 1D lists eight features: uses reflection, overrides readObject, overrides hashCode, has generic field, implements map, implements comparator, calls hashCode, and calls compare.

Returning to FIG. 1A, the classes (116A, 116N) are associated with feature vectors (118A, 118N). For example, a class (116A) may be represented as a Boolean feature vector (118A) where each Boolean value in the feature vector (118A) indicates whether or not the class (116A) has an example feature (146) in FIG. 1D. Given n Boolean features, the number of possible feature vectors is finite and equal to $2^n$.

The feature vectors (118A, 118N) are associated with probability windows (119A, 119N). A probability window (119A) indicates a likelihood that a feature vector (118A) represents a particular categorization of a class (116A). For example, the categorization may be that the class is malicious or benign. The probability window (119A) may be a confidence interval for a probability. The confidence interval may specify an upper bound and a lower bound for the probability. For example, a probability window of [0.4, 0.6] may represent a 95% confidence interval for a probability of 0.5. Continuing this example, a probability window of [0.3, 0.7] may represent a 99% confidence interval for a probability of 0.5.

The deserialization manager (108) includes a benign deserialization model (120), a malicious deserialization model (122), a deserialization model trainer (124), and a feature generator (126). The feature generator (126) includes functionality to generate feature vectors (118A, 118N) for classes (116A, 116N).

The benign deserialization model (120) includes functionality to generate a probability window indicating a likelihood that a feature vector represents a benign class that does not include a deserialization vulnerability. Similarly, the malicious deserialization model (122) includes functionality to generate a probability window indicating a likelihood that a feature vector represents a malicious class that includes a deserialization vulnerability.

Figure 1E:
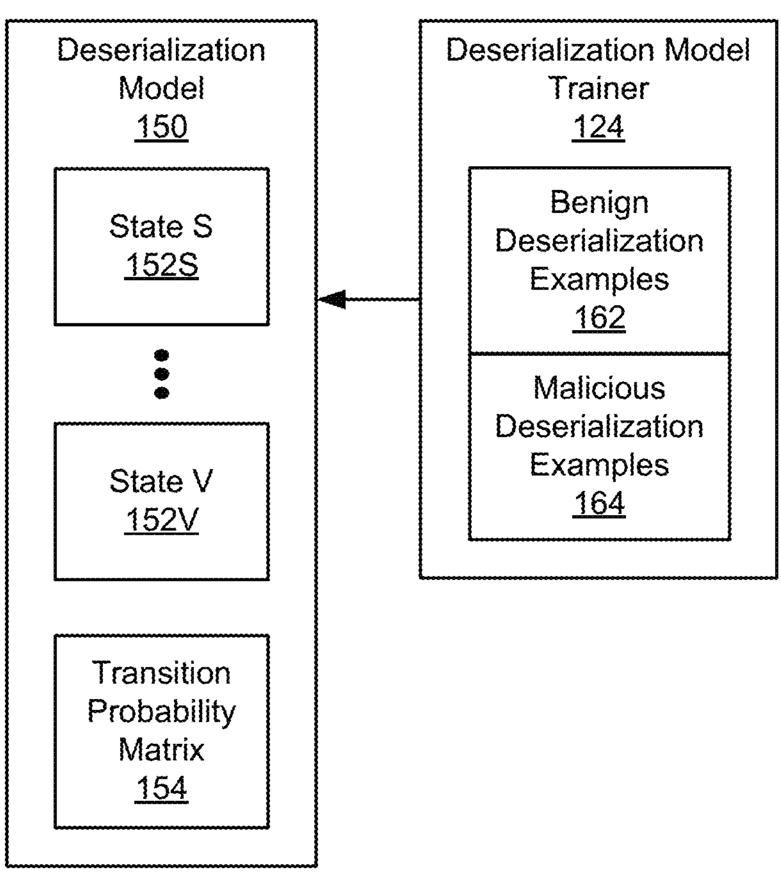
Figure 1F:
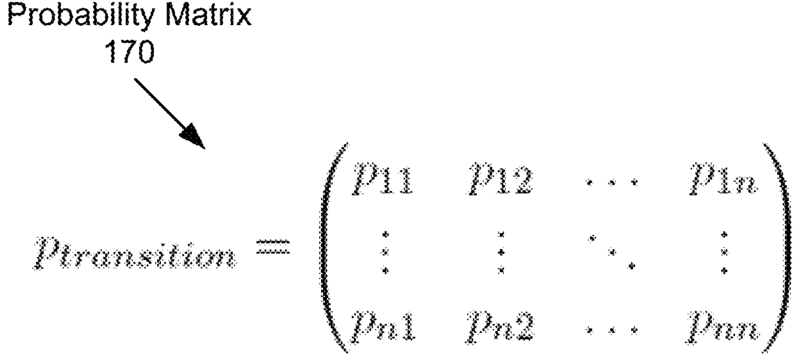

Turning to FIG. 1E, a deserialization model (150) includes states (152S, 152V) and a transition probability matrix (154). The deserialization model (150) may be implemented as a Markov chain that represents a system with a finite number of states $S=\{s_1, s_2, \ldots, s_n\}$, where transitions occur between states with a probability p at each step t. The probability of the system starting in a state $s_i \in S$ is captured by an initial state probability vector $p_{init}=(p_1, p_2, \ldots, p_n)$ where each probability $p_i$ corresponds to the probability of the chain starting in state $s_i$, and where the probabilities in $p_{init}$ sum to one. In a Markov chain, the probability of transitioning from a state $s_i$ to another state $s_j$ may depend on $s_i$ alone, and may be captured by a transition probability matrix (154) whose rows correspond to the state at step t and whose columns correspond to the state at step t+1. The probabilities in the transition probability matrix (154) represent the likelihood of a class B following a class A in a byte stream. FIG. 1F shows an example of a transition probability matrix (170).

Given a Markov chain and a state sequence $(x_1, x_2, \ldots, x_n)$, the probability that the Markov chain generated the state sequence may be calculated as a product of probabilities:

$$P((x_1, x_2, \ldots, x_n)) = p_{init}(x_1) \cdot p_{transition}(x_{i-1} x_i)$$

In one or more embodiments, because multiplying probabilities as above may result in underflows and loss of precision, the sum of the log of probabilities may be calculated instead.

In one or more embodiments, the states (152S, 152V) of the Markov chain are the set of possible feature vectors. Because the maximum number of states grows exponentially with the number of features, the set of dynamically observed feature vectors may be used as the states (152S, 152V) of the Markov chain. For example, the number of dynamically observed feature vectors may be much smaller than the maximum number of $2^n$ feature vectors, where n is the number of features. To account for unobserved feature vectors, unobserved states may map to a generic state of the Markov chain.

The deserialization model trainer (124) includes functionality to train a deserialization model (150). The deserialization model (150) may be trained using dynamic observations. For example, the deserialization model trainer (124) may train the malicious deserialization model (122) using malicious deserialization examples (164). Similarly, the deserialization model trainer (124) may train the benign deserialization model (120) using benign deserialization examples (162).

The probabilities in the Markov chain may be generated from deserialization examples in training data, in this case, training byte streams. The training byte streams may be deserialized to extract sequences of classes resulting in a sequence of classes per training byte stream. For example, a programming language (e.g., Java) may provide a native deserialization mechanism. The feature generator (126) may generate a sequence of feature vectors for each extracted sequence of classes. Each sequence of feature vectors corresponds to a state sequence in an instance of a Markov chain from which initial and state transition probabilities may be generated. One straightforward approach for generating the initial and state transition probabilities is to use empirically observed frequencies as probabilities, which may be effective when the number of deserialization examples in the training data is large (e.g., based on the Law of Large Numbers). However, when the number of deserialization examples in the training data is small, statistical inference methods may be preferable. For example, because deserialization is a relatively uncommon operation, there may be few deserialization examples in the training data. Furthermore, the number of publicly available malicious deserialization examples (e.g., deserialization exploits) may be very small. This disclosure uses Bayesian inference to estimate the probabilities of a Markov chain where empirical observations are used to guide the inference process.

Bayesian inference models the variables to infer, in this case initial and transition probabilities, as random variables generated using specific probability distributions. Then, through a search process, Bayesian inference infers the parameters of the probability distributions that maximize the likelihood of the empirically observed state sequences.

For example, the initial state probability of a Markov chain may be represented as a vector of probabilities that sum to one. In Bayesian inference, an initial goal is to model the empirically observed initial state probabilities as the outcome of a known probability distribution with unknown parameters. For example, the Dirichlet distribution is parameterized with a vector of concentration parameters $(a_1, \ldots, a_K)$ where $a_i>0$, and generates, as output, a vector of K real numbers that sum to one: $(x_1, \ldots, x_K)$, where $x_i \in [0, 1]$.

In one or more embodiments, the observed initial state probabilities are modeled as the output of a Dirichlet distribution parameterized with a vector of K unknown concentration parameters, where K is the number of states in the Markov chain. Through a guided search process, a Bayesian inference engine may search the space of possible concentration parameter vectors and return the Dirichlet distributions that are likely to have generated the observed probabilities. The transition probabilities may be generated in a similar fashion where each row in the transition probability matrix is modeled as a separate Dirichlet distribution. Through the search process, Bayesian inference may generate multiple probability distributions, where the more recent probability distributions are likely to more precisely capture the true underlying probability distribution. In cases where the number of observations number of deserialization examples in the training data is small, the search might not converge to a single solution, but rather may converge to a set of plausible solutions. Metrics such as standard deviations over the set of generated solutions may be used to estimate the confidence in the generated solutions.

In one or more embodiments, the observed initial state probabilities is modeled as the output of any distribution that outputs a vector of real numbers that sum to one.

Bayesian inference may generate multiple benign Markov chains modeling benign deserialization examples and multiple malicious Markov chains modeling malicious deserialization examples. The benign deserialization examples may be extracted from trusted executions of one or more software applications, whereas malicious deserialization examples may be extracted from known deserialization exploits.

Returning to FIG. 1A, the user computing system (102) may be a mobile device (e.g., phone, tablet, digital assistant, laptop, etc.) or any other computing device (e.g., desktop, terminal, workstation, etc.) with a computer processor (not shown) and memory (not shown) capable of running computer software. The user computing system (102) includes functionality to execute code (130) to generate a byte stream (112). For example, the code (130) may generate the byte stream (112) by serializing one or more objects. The byte stream (112) may thus be a candidate for deserialization (i.e., reconstructing one or more objects from the byte stream (112)). The code (130) is a collection of statements (e.g., computer instructions) written in source code of a human-readable programming language. As an example, the code (130) may perform a static analysis or dynamic analysis of an application program. The user computing system (102) includes functionality to send the byte stream (112) to the deserialization manager (108).

The deserialization manager (108) includes functionality to make class deserialization decisions (132) for classes (116A, 116N) corresponding to class names (114A, 114N) extracted from a byte stream (112). For example, a class deserialization decision (132) may allow or prevent the deserialization of a class (116A). The deserialization filter generator includes functionality to send the deserialization decisions (132) to the user computing system (102).

In one or more embodiments, the computer processor(s) (110) takes the form of the computer processor(s) (502) described with respect to FIG. 5A and the accompanying description below. In one or more embodiments, the computer processor (110) includes functionality to execute the deserialization filter generator.

While FIG. 1A and FIG. 1B show a configuration of components, other configurations may be used without departing from the scope of the invention. For example, various components may be combined to create a single component. As another example, the functionality performed by a single component may be performed by two or more components.

Figure 2:
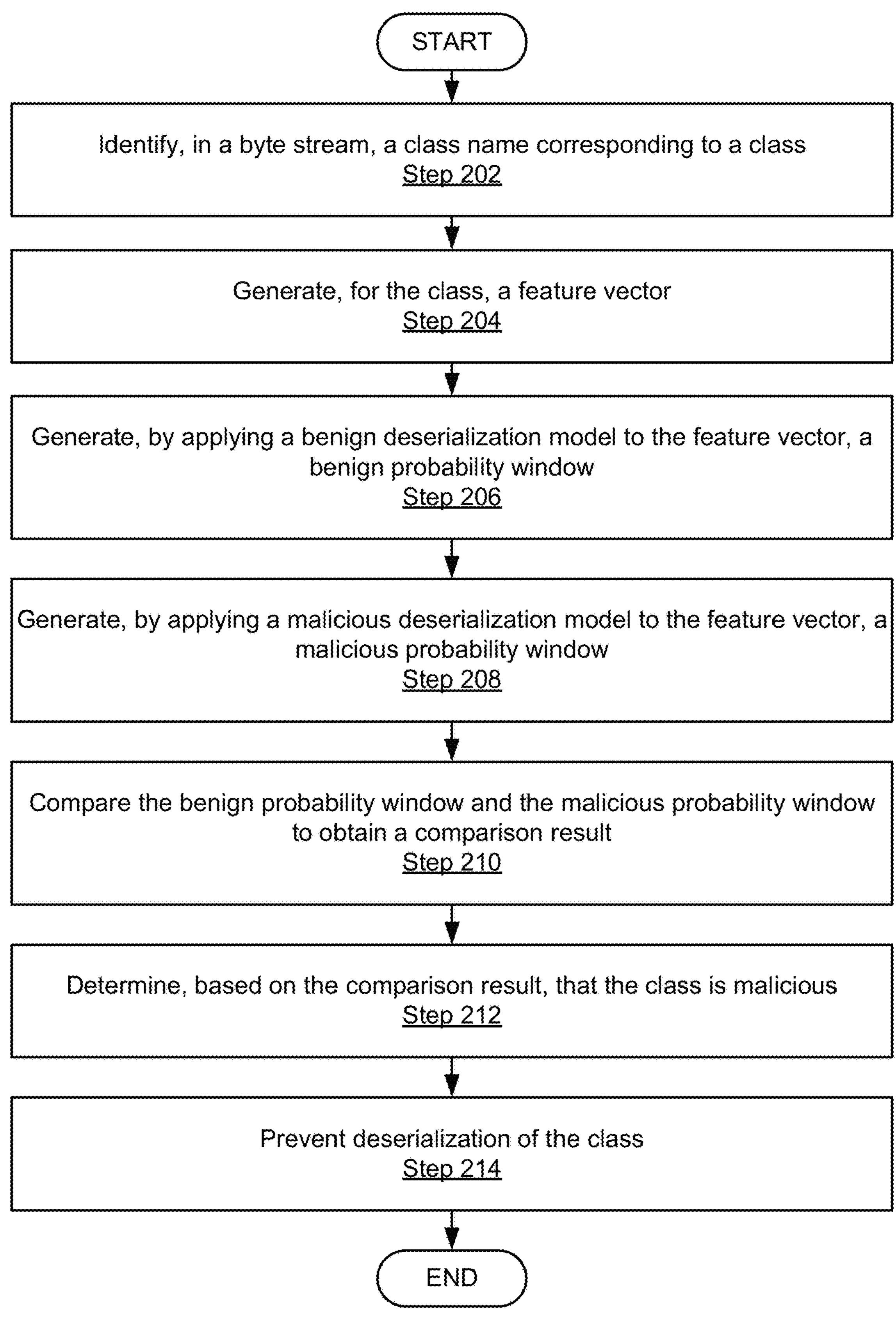
FIG. 2 and FIG. 3 show flowcharts in accordance with one or more embodiments of the invention.

FIG. 2 shows a flowchart in accordance with one or more embodiments of the invention. The flowchart depicts a process for detecting a deserialization attack. One or more of the steps in FIG. 2 may be performed by the components (e.g., the deserialization manager (108) of the back-end computing system (104) and/or the user computing system (102), discussed above in reference to FIG. 1A). In one or more embodiments of the invention, one or more of the steps shown in FIG. 2 may be omitted, repeated, and/or performed in parallel, or in a different order than the order shown in FIG. 2. Accordingly, the scope of the invention should not be considered limited to the specific arrangement of steps shown in FIG. 2.

Initially, in Step 202, a class name is identified in a byte stream. The class name corresponds to a class. For example, a stream object (e.g., a Java ObjectInputStream) may be created to read the byte stream. The characters in the byte stream may be parsed into tokens. A token may correspond to a class name of a class in a programming language. For example, the class may be a native class of the programming language or a user-defined class.

In Step 204, a feature vector is generated for the class. The feature generator may map the class to a feature vector that includes Boolean values indicating whether the class has a specific feature. For example, FIG. 1D shows a non-exhaustive list of example features that may be used to describe a class.

In Step 206, a benign probability window is generated by applying a benign deserialization model to the feature vector. The benign deserialization model may include multiple Markov chains (e.g., state sequences), each of which may be applied to the feature vector to generate a probability that the respective Markov chain generated the feature vector. The deserialization manager may generate the benign probability window by calculating the mean and standard deviation of the probabilities generated by the multiple Markov chains. For example, the deserialization manager may generate the benign probability window as a 95% or 99% confidence (e.g., corresponding to 2 or 3 standard deviations, respectively) interval for the generated probabilities. For example, the benign probability window may be [0.2, 0.25] and may represent a 95% confidence interval for a probability of 225.

In Step 208, a malicious probability window is generated by applying a malicious deserialization model to the feature vector (see description of Step 206 above). The malicious deserialization model may include multiple Markov chains, each of which is applied to the feature vector to generate a probability that the respective Markov chain generated the feature vector. The deserialization manager may generate the malicious probability window by calculating the mean and standard deviation of the probabilities generated by the multiple Markov chains. For example, the malicious probability window may be [0.3, 0.35] and may represent a 95% confidence interval for a probability of 0.325.

In Step 210, the benign probability window and the malicious probability window are compared to obtain a comparison result. For example, the comparison result may be that the benign probability window and the malicious probability window are disjoint (i.e., non-overlapping). Continuing the above example, the benign probability window of [0.2, 0.25] and the malicious probability window of [0.3, 0.35] are disjoint. Alternatively, the comparison result may be that the benign probability window and the malicious probability window overlap. For example, a benign probability window of [0.275, 0.325] overlaps a malicious probability window of [0.3, 0.35].

In Step 212, the class is determined to be malicious based on the comparison result. For example, the class may be determined to be malicious when the comparison result is that the benign probability window and the malicious probability window are disjoint and that the malicious probability window is greater than the benign probability window. Continuing the above example, a benign probability window of [0.2, 0.25] and a malicious probability window of [0.3, 0.35] are disjoint, where the malicious probability window is greater than the benign probability window. Alternatively, the class may be determined to be benign when the comparison result is that the benign probability window and the malicious probability window are disjoint and that the benign probability window is greater than the malicious probability window.

Still alternatively, the decision regarding how to categorize the class (e.g., as either malicious or benign) may be postponed when the comparison result is that the benign probability window and the malicious probability window overlap. For example, the benign probability window may be [0.275, 0.325] and the malicious probability window may be [0.3, 0.35]. In other words, when the benign probability window and the malicious probability window overlap, there is insufficient statistical confidence to decide whether to categorize the class as malicious or benign.

When the benign probability window and the malicious probability window overlap, a next iteration of the process of FIG. 2 may be executed to process the next class name identified in the byte stream. For example, the following steps may be performed in the next iteration of the process of FIG. 2:

In Step 202, a next class name corresponding to a next class is identified in the byte stream.

In Step 204, a next feature vector is generated for the next class.

In Step 206, a next benign probability window is generated by applying the benign deserialization model to the next feature vector. The benign deserialization model may generate next probabilities for the next feature vector. Then, the deserialization manager may multiply the previous probabilities (e.g., probabilities generated by the previous iteration of the process of FIG. 2) by the next probabilities to obtain multiplied probabilities. The second benign probability window is generated using the multiplied probabilities. The multiplication calculation is efficient because the multiplication calculation may be performed using matrix multiplication.

Thus, the second benign probability window corresponds to the sequence of the previous class (e.g., the class identified by the previous iteration of the process of FIG. 2) followed by the next class.

In Step 208, a next malicious probability window is generated by applying the malicious deserialization model to the next feature vector (see above description of the next iteration of Step 206).

In Step 210, the next benign probability window and the next malicious probability window are compared to obtain a next comparison result.

In Step 212, the next class is determined to be malicious or benign based on the next comparison result. If the next benign probability window and the next malicious probability window overlap, yet another iteration of the process of FIG. 2 may be executed to process an additional class name identified in the byte stream. Additional iterations of the process of FIG. 2 may be executed, while additional class names are in the byte stream, until the benign probability window and the malicious probability window no longer overlap. Each additional iteration incrementally extends the sequence of classes to include an additional class.

In Step 214, deserialization of the class is prevented. For example, preventing deserialization of a class determined to be malicious may include preventing the creation of an object of the class in a memory of the back-end computing system or the user computing system.

Figure 3:
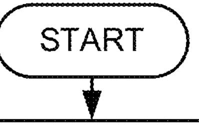
Figure 3:
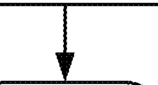

FIG. 3 shows a flowchart in accordance with one or more embodiments of the invention. The flowchart depicts a process for detecting a deserialization attack. One or more of the steps in FIG. 3 may be performed by the components (e.g., the deserialization manager (108) of the back-end computing system (104) and/or the user computing system (102), discussed above in reference to FIG. 1A). In one or more embodiments of the invention, one or more of the steps shown in FIG. 3 may be omitted, repeated, and/or performed in parallel, or in a different order than the order shown in FIG. 3. Accordingly, the scope of the invention should not be considered limited to the specific arrangement of steps shown in FIG. 3.

In Step 302, a byte stream is sent to a deserialization manager configured to transmit a determination that a class is malicious by performing the steps of FIG. 2. The byte stream may be sent to the deserialization manager via a network.

In Step 304, the determination that the class is malicious is received from the deserialization manager. The determination that the class is malicious may be received from the deserialization manager via the network.

Figure 4A:
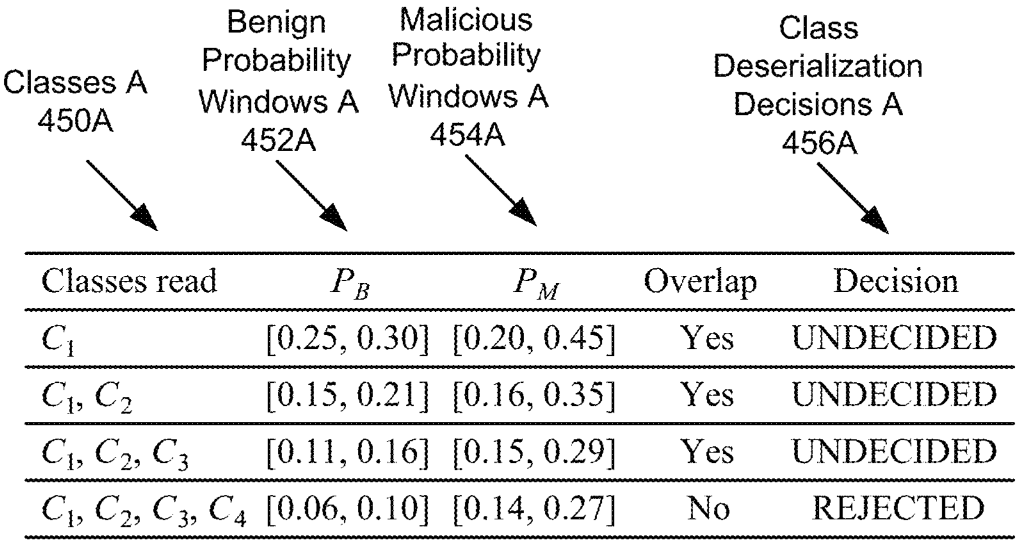
FIG. 4A and FIG. 4B show examples in accordance with one or more embodiments of the invention.
Figure 4B:
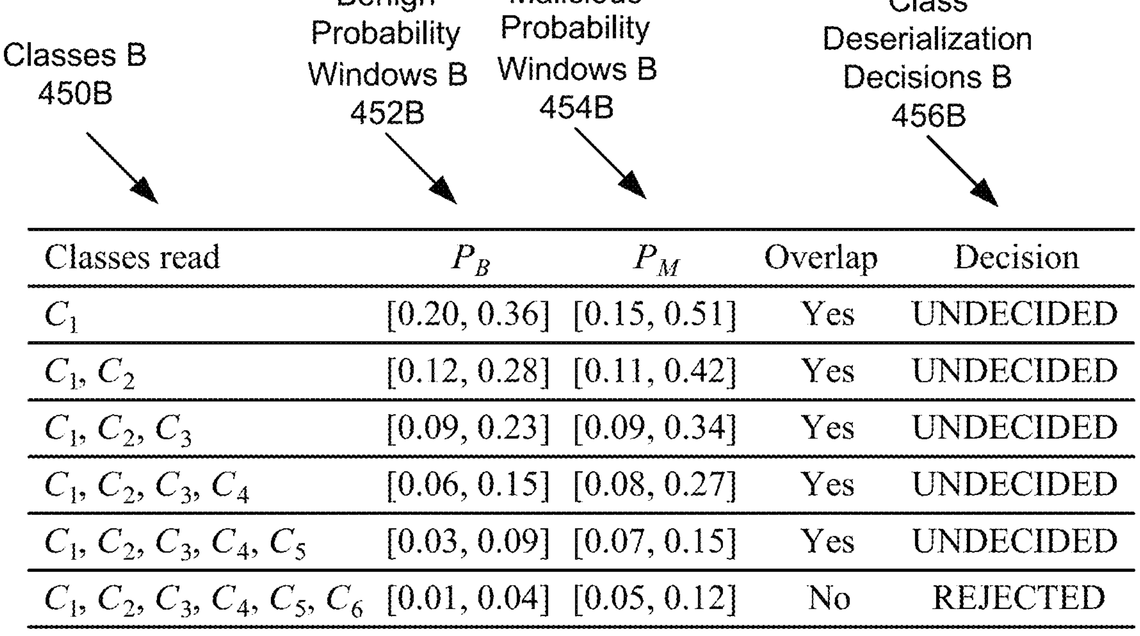

FIG. 4A and FIG. 4B show implementation examples in accordance with one or more embodiments. The implementation examples are for explanatory purposes only and not intended to limit the scope of the invention. One skilled in the art will appreciate that implementation of embodiments of the invention may take various forms and still be within the scope of the invention.

FIG. 4A shows the evolving state of a process for detecting a deserialization attack. The deserialization manager identifies a sequence of classes (450A) ((116A, 116N) in FIG. 1A) in a byte stream. The feature generator generates a feature vector for each class. The deserialization manager generates, for each feature vector, a benign probability window (452A) ((119A, 119N) in FIG. 1A) and a malicious probability window (454A) by applying a benign deserialization model and a malicious deserialization model, respectively, to the feature vector. The sizes of the benign probability window (452A) and a malicious probability window (454A) are based on calculating a two standard deviation confidence interval that the Markov chains of the respective model generated the observed sequence of classes (450A). In this example, after classes $C_1$, $C_2$, and $C_3$ are identified, the benign probability window (452A) and the malicious probability window (454A) overlap, and the corresponding class deserialization decision (456A) ((132) in FIG. 1A) is "undecided." However, after class $C_4$ is identified, the benign probability window (452A) and the malicious probability window (454A) are disjoint, and the corresponding class deserialization decision (456A) is "rejected" because the malicious probability window (454A) exceeds the benign probability window (452A). Thus, deserialization of the byte stream is prevented.

Because state transition probabilities are multiplied each time a new class is identified, the benign probability window (452A) and a malicious probability window (454A) decrease over time. This is not a problem because the process is designed to predict whether the benign deserialization model or the malicious deserialization model most likely generated the observed sequence of classes.

The number of standard deviations used to generate the benign probability window (452A) and the malicious probability window (454A) may be a configurable parameter. Increasing the number of standard deviations increases confidence by widening the probability window, but may require additional classes to be identified before an "accepted" or "rejected" decision is reached, if ever. Conversely, decreasing the number of standard deviations lowers confidence by narrowing the probability window, but may require fewer classes to be identified before reaching an "accepted" or "rejected" decision. Lower confidence yields more an "accepted" or "rejected" decisions at the expense of more false positives and false negatives, while higher confidence yields more "undecided" decisions, but generates fewer false positives and false negatives.

FIG. 4B shows the evolving state of a process for detecting a deserialization attack configured using a three standard deviation confidence interval. The deserialization manager identifies a sequence of classes (450B) in a byte stream. As in FIG. 4B, the feature generator generates a feature vector for each class. The deserialization manager generates, for each feature vector, a benign probability window (452B) and a malicious probability window (454B) by applying the benign deserialization model and the malicious deserialization model, respectively, to the feature vector. In FIG. 4B, after classes $C_1$, $C_2$, $C_3$, $C_4$, and $C_5$ are identified, the benign probability window (452B) and the malicious probability window (454B) overlap, and the corresponding class deserialization decision (456B) is "undecided." However, after class $C_6$ is identified, the benign probability window (452B) and the malicious probability window (454B) are disjoint, and the corresponding class deserialization decision (456B) is "rejected." Thus, in FIG. 4B, 2 additional classes are identified in the byte stream before the deserialization manager reaches the same "rejected" decision that was reached using the 2 standard deviation confidence interval used in FIG. 4A.

Embodiments disclosed herein may be implemented on a computing system specifically designed to achieve an improved technological result. When implemented in a computing system, the features and elements of this disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities that implement the features and elements of the disclosure.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5A:
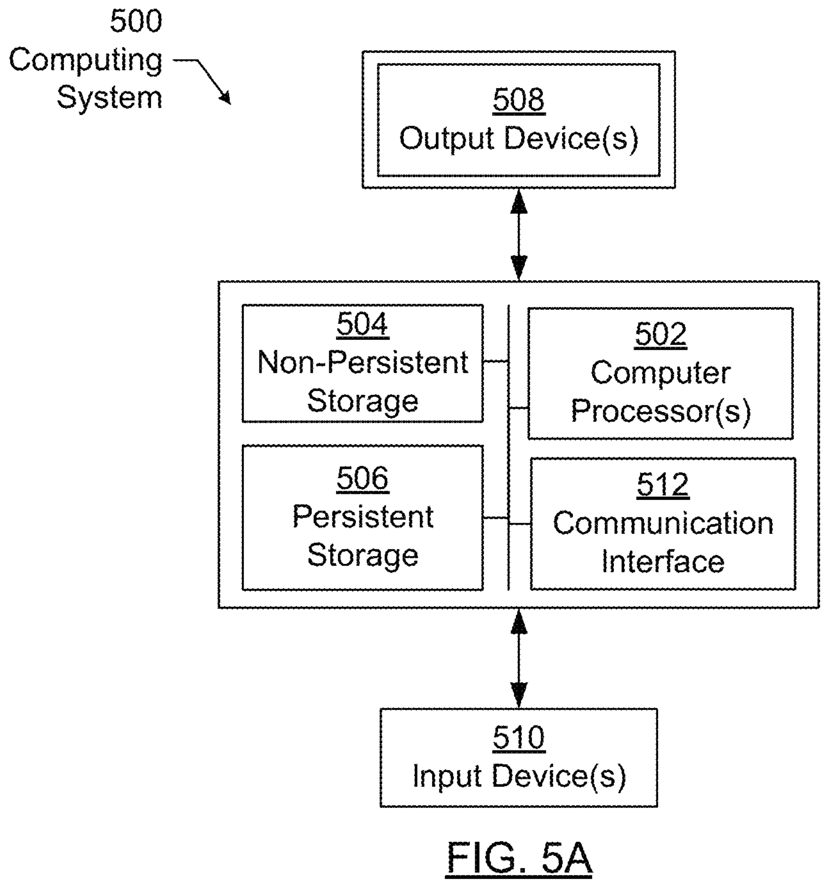
FIG. 5A and FIG. 5B show computing systems in accordance with one or more embodiments of the invention.
Figure 5B:
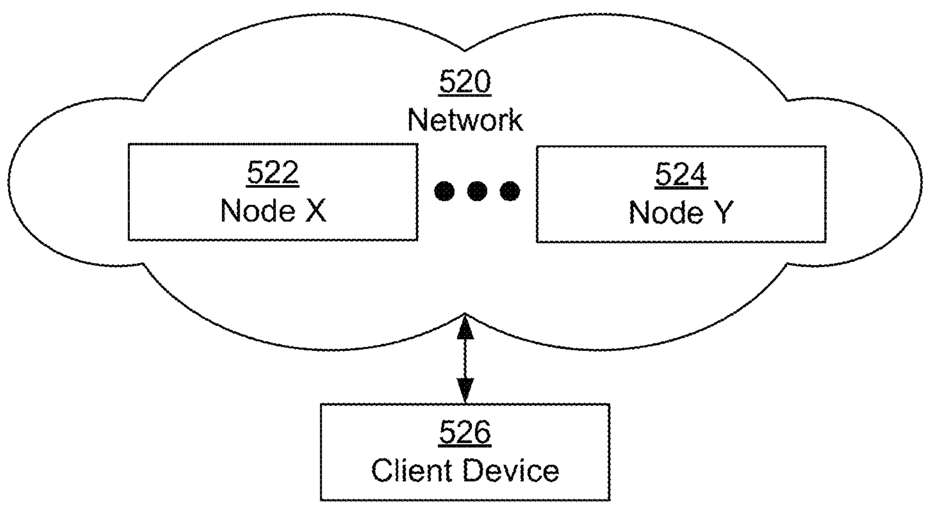

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments disclosed herein.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel end-points enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions presents only a few examples of functions performed by the computing system of FIG. 5A and the nodes and/or client device in FIG. 5B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for detecting a deserialization attack, comprising:

identifying, in a byte stream, a first class name corresponding to a first class;

generating, for the first class, a first feature vector;

generating, by applying a benign deserialization model to the first feature vector, a first benign confidence interval of a probability that the first class is benign, wherein the benign deserialization model comprises a Markov chain comprising a set of states and a set of probabilities of transitioning between two states in the set of states at a corresponding timestep, wherein the benign deserialization model comprises a plurality of Markov chains models comprising the Markov chain, and wherein applying the benign deserialization model comprises:

for each respective Markov chain model of at least two of the plurality of Markov chain models to generate a plurality of probabilities:

calculating a respective probability, in the plurality of probabilities, that the respective Markov chain model generated the first feature vector, and determining the first benign confidence interval from the plurality of probabilities;

generating, by applying a malicious deserialization model to the first feature vector, a first malicious confidence interval of a probability that the first class is malicious;

comparing the first benign confidence interval and the first malicious confidence interval to obtain a first comparison result, wherein comparing the first benign confidence interval and the first malicious confidence interval comprises determining whether the first benign confidence interval and the first malicious confidence interval overlap; and determining, based on the first comparison result, that the first class is malicious.

2. The method of claim 1, further comprising:

in response to determining that the first class is malicious, preventing deserialization of the first class.

3. The method of claim 1, wherein generating the first malicious confidence interval comprises:

generating, for the first feature vector, a second plurality of probabilities, and calculating, for the second plurality of probabilities, a mean and a standard deviation.

4. The method of claim 1, further comprising:

determining that the first benign confidence interval and the first malicious confidence interval overlap;

identifying, in the byte stream and following the first class name, a second class name corresponding to a second class;

generating, for the second class, a second feature vector;

generating, by applying the benign deserialization model to the second feature vector, a second benign confidence interval;

generating, by applying the malicious deserialization model to the second feature vector, a second malicious confidence interval;

comparing the second benign confidence interval and the second malicious confidence interval to obtain a second comparison result; and determining, based on the second comparison result, that the second class is malicious.

5. The method of claim 1, further comprising training the malicious deserialization model by:

deserializing a plurality of malicious deserialization examples to obtain a plurality of training sequences of class names, obtaining, for the plurality of training sequences of class names, a plurality of training feature vectors, and generating a plurality of transitional probability matrices by applying Bayesian inference to the plurality of training feature vectors.

6. The method of claim 5, wherein each of the transitional probability matrices comprises a plurality of rows, the method further comprising:

modeling the plurality of rows as a plurality of Dirichlet distributions.

7. A system for detecting a deserialization attack, comprising:

a repository configured to store:

a first class corresponding to a first feature vector, and a byte stream comprising a first class name corresponding to the first class;

a computer processor and a memory;

a feature generator executing on the computer processor and using the memory, wherein the feature generator is configured to generate, for the first class, the first feature vector; and a deserialization manager executing on the computer processor and using the memory, wherein the deserialization manager is configured to:

identify, in the byte stream, the first class name, generate, by applying a malicious deserialization model to the first feature vector, a first malicious confidence interval of a probability that the first class is malicious, generate, by applying a benign deserialization model to the first feature vector, a first benign confidence interval of a probability that the first class is benign, wherein the benign deserialization model comprises a Markov chain comprising a set of states and a set of probabilities of transitioning between two states in the set of states at a corresponding timestep, wherein the benign deserialization model comprises a plurality of Markov chains models comprising the Markov chain, and wherein applying the benign deserialization model comprises:

for each respective Markov chain model of at least two of the plurality of Markov chain models to generate a plurality of probabilities:

calculating a respective probability, in the plurality of probabilities, that the respective Markov chain model generated the first feature vector, and determining the first benign confidence interval from the plurality of probabilities, compare the first benign confidence interval and the first malicious confidence interval to obtain a first comparison result, wherein comparing the first benign confidence interval and the first malicious confidence interval comprises determining whether the first benign confidence interval and the first malicious confidence interval overlap, and determine, based on the first comparison result, that the first class is malicious.

8. The system of claim 7, wherein the deserialization manager is further configured to:

in response to determining that the first class is malicious, prevent deserialization of the first class.

9. The system of claim 7, wherein the deserialization manager is further configured to generate the first malicious confidence interval by:

generating, for the first feature vector, a second plurality of probabilities, and calculating, for the second plurality of probabilities, a mean and a standard deviation.

10. The system of claim 7, wherein the deserialization manager is further configured to:

determine that the first benign confidence interval and the first malicious confidence interval overlap, identify, in the byte stream and following the first class name, a second class name corresponding to a second class, generate, by applying the benign deserialization model to a second feature vector, a second benign confidence interval, generate, by applying the malicious deserialization model to the second feature vector, a second malicious confidence interval, compare the second benign confidence interval and the second malicious confidence interval to obtain a second comparison result, and determine, based on the second comparison result, that the second class is malicious, wherein the feature generator is further configured to generate, for the second class, the second feature vector.

11. The system of claim 7, further comprising a deserialization model trainer executing on the computer processor and using the memory, wherein the deserialization model trainer is configured to train the malicious deserialization model by:

deserializing a plurality of malicious deserialization examples to obtain a plurality of training sequences of class names, obtaining, for the plurality of training sequences of class names, a plurality of training feature vectors, and generating a plurality of transitional probability matrices by applying Bayesian inference to the plurality of training feature vectors.

12. The system of claim 11, wherein each of the transitional probability matrices comprises a plurality of rows, and wherein the deserialization model trainer is further configured to:

model the plurality of rows as a plurality of Dirichlet distributions.

13. A method for detecting a deserialization attack, comprising:

sending a byte stream to a deserialization manager configured to perform:

identifying, in the byte stream, a first class name corresponding to a first class, generating, for the first class, a first feature vector, generating, by applying a benign deserialization model to the first feature vector, a first benign confidence interval of a probability that the first class is benign, wherein the benign deserialization model comprises a Markov chain comprising a set of states and a set of probabilities of transitioning between two states in the set of states at a corresponding timestep, wherein the benign deserialization model comprises a plurality of Markov chains models comprising the Markov chain, and wherein applying the benign deserialization model comprises:

for each respective Markov chain model of at least two of the plurality of Markov chain models to generate a plurality of probabilities:

calculating a respective probability, in the plurality of probabilities, that the respective Markov chain model generated the first feature vector, and determining the first benign confidence interval from the plurality of probabilities, generating, by applying a malicious deserialization model to the first feature vector, a first malicious confidence interval of a probability that the first class is malicious, comparing the first benign confidence interval and the first malicious confidence interval to obtain a first comparison result, wherein comparing the first benign confidence interval and the first malicious confidence interval comprises determining whether the first benign confidence interval and the first malicious confidence interval overlap, making a first determination, based on the first comparison result, that the first class is malicious, and transmitting the first determination that the first class is malicious; and receiving, from the deserialization manager, the first determination that the first class is malicious.

14. The method of claim 13, wherein the deserialization manager is further configured to perform:

in response to determining that the first class is malicious, preventing deserialization of the first class.

15. The method of claim 13, wherein the deserialization manager is further configured to generate the first malicious confidence interval by:

generating, for the first feature vector, a second plurality of probabilities; and calculating, for the second plurality of probabilities, a mean and a standard deviation.

16. The method of claim 13, wherein the deserialization manager is further configured to perform:

determining that the first benign confidence interval and the first malicious confidence interval overlap;

identifying, in the byte stream and following the first class name, a second class name corresponding to a second class;

generating, for the second class, a second feature vector;

generating, by applying the benign deserialization model to the second feature vector, a second benign confidence interval;

generating, by applying the malicious deserialization model to the second feature vector, a second malicious confidence interval;

comparing the second benign confidence interval and the second malicious confidence interval to obtain a second comparison result; and determining, based on the second comparison result, that the second class is malicious.

17. The method of claim 13, wherein the deserialization manager is further configured to train the malicious deserialization model by:

deserializing a plurality of malicious deserialization examples to obtain a plurality of training sequences of class names;

obtaining, for the plurality of training sequences of class names, a plurality of training feature vectors; and generating a plurality of transitional probability matrices by applying Bayesian inference to the plurality of training feature vectors.

* * * * *